(12) United States Patent
Liu et al.

(10) Patent No.: US 11,822,189 B2
(45) Date of Patent: Nov. 21, 2023

(54) PIXEL UNIT AND LIQUID CRYSTAL DISPLAY DEVICE

(71) Applicant: Shenzhen China Star Optoelectronics Semiconductor Display Technology Co., Ltd., Guangdong (CN)

(72) Inventors: Tongxiu Liu, Guangdong (CN); Xiaohui Yao, Guangdong (CN); Ilgon Kim, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 467 days.

(21) Appl. No.: 17/051,254

(22) PCT Filed: May 11, 2020

(86) PCT No.: PCT/CN2020/089597
§ 371 (c)(1),
(2) Date: Oct. 28, 2020

(87) PCT Pub. No.: WO2021/212563
PCT Pub. Date: Oct. 28, 2021

(65) Prior Publication Data
US 2023/0143788 A1     May 11, 2023

(30) Foreign Application Priority Data
Apr. 24, 2020 (CN) .................. 202010330456.X

(51) Int. Cl.
G02F 1/1343 (2006.01)
G02F 1/1368 (2006.01)

(52) U.S. Cl.
CPC ...... *G02F 1/134309* (2013.01); *G02F 1/1368* (2013.01); *G02F 1/13439* (2013.01); *G02F 2201/123* (2013.01)

(58) Field of Classification Search
CPC .............. G02F 1/1343; G02F 1/13439; G02F 1/134309; G02F 1/1362; G02F 1/136286; G02F 1/1368; G02F 2201/123
See application file for complete search history.

(56) References Cited

U.S. PATENT DOCUMENTS

2007/0103607 A1   5/2007 Hanaoka et al.
2013/0050629 A1   2/2013 Kang
(Continued)

FOREIGN PATENT DOCUMENTS

CN    1441400    9/2003
CN    102305983  1/2012
(Continued)

*Primary Examiner* — Thoi V Duong

(57) ABSTRACT

A pixel unit and an LCD device are disclosed. The pixel unit comprises four sub-pixel units. Each of the sub-pixel units comprises a pixel electrode, comprising a plurality of strip portions positioned at intervals. Two adjacent strip portions define a slit. One strip portion and one slit adjacent to the strip portion are defined as an electrode portion and a width of the electrode portion is a sum of a width of the slit and a width of the strip portion. The width of each of the electrode portions and/or the width of each of the strip portions and/or the width of each of the slits is different. Since the pixel electrodes in different positions have a different aperture ratio-voltage curve. This improves the viewing angle deviation of the four domain pixel electrode.

12 Claims, 3 Drawing Sheets

(56) References Cited

U.S. PATENT DOCUMENTS

2018/0045998 A1* 2/2018 Ye .................... G02F 1/133707
2018/0157128 A1    6/2018 Yao
2018/0217451 A1    8/2018 Yao et al.

FOREIGN PATENT DOCUMENTS

| CN | 102768443 | 11/2012 |
| CN | 102955300 | 3/2013 |
| CN | 105116646 | 12/2015 |
| CN | 105137678 | 12/2015 |
| CN | 106707628 | 5/2017 |
| CN | 107037645 | 8/2017 |

* cited by examiner

PIXEL UNIT AND LIQUID CRYSTAL DISPLAY DEVICE

RELATED APPLICATIONS

This application is a National Phase of PCT Patent Application No. PCT/CN2020/089597 having International filing date of May 11, 2020, which claims the benefit of priority of Chinese Patent Application No. 202010330456.X filed on Apr. 24, 2020. The contents of the above applications are all incorporated by reference as if fully set forth herein in their entirety.

FIELD AND BACKGROUND OF THE INVENTION

The present invention relates to a display technique, and more particularly, to a pixel unit and a liquid crystal display (LCD) device.

Because the pixel size of the 8K LCD device is small, the 4 domain pixel electrode design is adopted in order to raise the aperture ratio of pixels. However, the widths of the strip portions and the widths of the slits are the same in all positions of the 4-domain pixel electrode design such that it has a huge viewing angle deviation. This seriously impacts the display quality of the 8 k LCD device and becomes an issue for developing 8 k LCD device.

Therefore, a new pixel unit and an LCD device need to developed to solve the above-mentioned issue.

SUMMARY OF THE INVENTION

One objective of an embodiment of the present invention is to provide a pixel unit and a LCD device to solve the issue of the huge viewing angle deviation caused by the same widths of the strip portions and the slits.

According to an embodiment of the present invention, a pixel unit is disclosed. The pixel unit comprises four sub-pixel units. Each of the sub-pixel units comprises a pixel electrode, comprising a plurality of strip portions positioned at intervals, wherein two adjacent strip portions define a slit. One strip portion and one slit adjacent to the strip portion are defined as an electrode portion and a width of the electrode portion is a sum of a width of the slit and a width of the strip portion. The width of each of the electrode portions and/or the width of each of the strip portions and/or the width of each of the slits is different. The strip portions and the slits are respectively positioned symmetrically in each of the sub-pixel units.

Optionally, the width of each of the electrode portions is different, the width of each of the strip portions is the same, and the width of each of the slits is different.

Optionally, the width of each of the electrode portions is different, the width of each of the strip portions is different, and the width of each of the slits is same.

Optionally, the width of each of the electrode portions is different, the width of each of the strip portions is different, and the width of each of the slits is different.

Optionally, the width of each of the electrode portions is the same, the width of each of the strip portions is different, and the width of each of the slits is different.

Optionally, the width of each of the electrode portions is between 5 microns and 6 microns.

Optionally, the width of each of the strip portions is between 2 microns and 4 microns.

Optionally, the width of each of the slits is between 2 microns and 3 microns.

Optionally, the pixel unit further comprises a main electrode, comprising a first main electrode and a second main electrode. The first main electrode is horizontally positioned and the second main electrode is vertically positioned, and the strip portion extends along the second main electrode to an edge of the pixel electrode. An angle between the slit and the first main electrode is one of 35 degree, 40 degree and 45 degree.

Optionally, a width evenly changes along a direction from far to near the first main electrode.

According to an embodiment of the present invention, a pixel unit is disclosed. The pixel unit comprises four sub-pixel units. Each of the sub-pixel units comprises a pixel electrode, comprising a plurality of strip portions positioned at intervals, wherein two adjacent strip portions define a slit. One strip portion and one slit adjacent to the strip portion are defined as an electrode portion and a width of the electrode portion is a sum of a width of the slit and a width of the strip portion. The width of each of the electrode portions and/or the width of each of the strip portions and/or the width of each of the slits is different.

Optionally, the width of each of the electrode portions is different, the width of each of the strip portions is the same, and the width of each of the slits is different.

Optionally, the width of each of the electrode portions is different, the width of each of the strip portions is different, and the width of each of the slits is same.

Optionally, the width of each of the electrode portions is different, the width of each of the strip portions is different, and the width of each of the slits is different.

Optionally, the width of each of the electrode portions is the same, the width of each of the strip portions is different, and the width of each of the slits is different.

Optionally, the width of each of the electrode portions is between 5 microns and 6 microns.

Optionally, the width of each of the strip portions is between 2 microns and 4 microns.

Optionally, the width of each of the slits is between 2 microns and 3 microns.

Optionally, the pixel unit further comprises a main electrode, comprising a first main electrode and a second main electrode. The first main electrode is horizontally positioned and the second main electrode is vertically positioned, and the strip portion extends along the second main electrode to an edge of the pixel electrode. An angle between the slit and the first main electrode is one of 35 degree, 40 degree and 45 degree.

According to an embodiment of the present invention, an LCD device is disclosed. The LCD device comprises the above-mentioned pixel unit.

A pixel unit and an LCD device are disclosed. The pixel unit comprises four sub-pixel units. Each of the sub-pixel unit comprises a pixel electrode. The pixel electrode comprises an electrode portion. The width of the electrode portion is a sum of the width of the strip portion and the width of the slit. The width of each of the electrode portions and/or the width of each of the strip portions and/or the width of each of the slits in different positions is different such that the pixel electrodes in different positions have a different aperture ratio-voltage curve. This improves the viewing angle deviation of the four domain pixel electrode and raises the display quality of the LCD device.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

Figure 1:
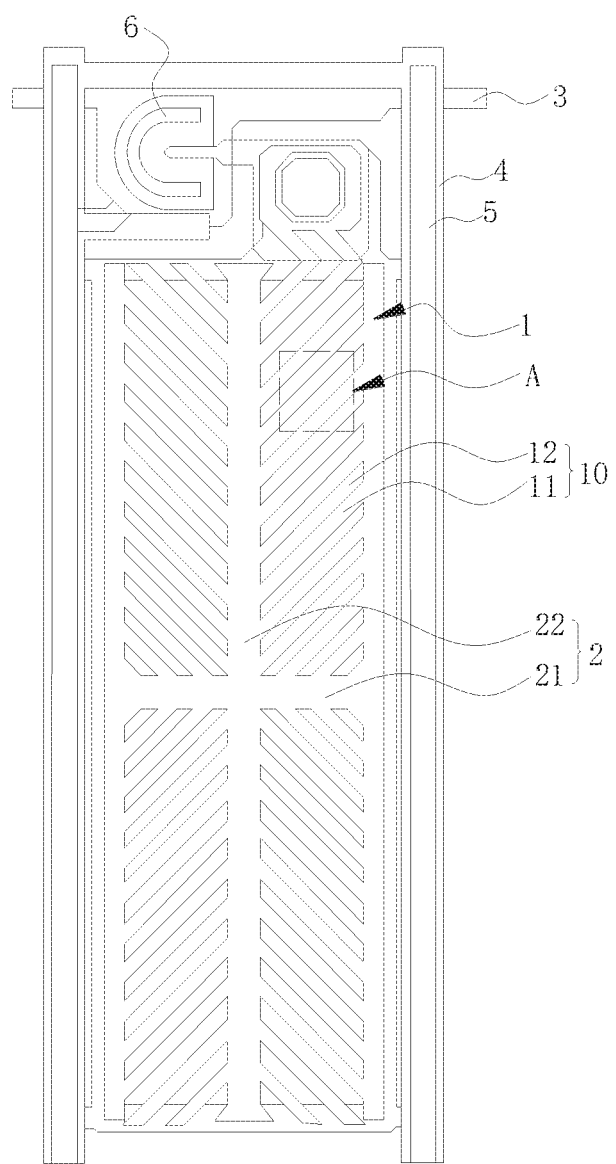
FIG. 1 is a diagram of a pixel unit according to an embodiment of the present invention.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

As previously mentioned, the conventional pixel unit and LCD device has an issue of huge viewing angle deviation. This issue is because the widths of the strip portions and the widths of the slits are the same in all positions of the 4-domain pixel electrode design. In the following disclosure, an embodiment is disclosed to solve the above-mentioned issue.

Please refer to FIG. 1. FIG. 1 is a diagram of a pixel unit according to an embodiment of the present invention. The pixel unit is a fourth domain pixel structure. That is, the pixel unit comprises four sub-pixel units. Each of the sub-pixel units comprises a pixel electrode 1. The pixel electrode 1 comprises a plurality of strip portions 11 positioned in intervals. In addition, two adjacent strip portions 11 define a slit 12 between the strip portions 11. The strip portion 11 and its adjacent slit 12 are defined as an electrode portion 10. The width of the electrode portion 10 is the sum of the width of the strip portion 11 and the width of the slit 12. That is, the width of the electrode portion 10 is the distance between the centers of two adjacent strip portions 11 or between the centers of two adjacent slits 12. The width of the electrode portion 10 is the pixel distance of the pixel electrode 1.

The pixel unit comprises a main electrode 2. The main electrode 2 comprises a first main electrode 21 and a second main electrode 22, which are positioned across each other. The first main electrode 21 is horizontally positioned and the second electrode 22 is vertically positioned. The strip portion 11 extends from the second main electrode 22 to the edge of the pixel electrode 1 to form a fish bone pattern and to define four domains.

The pixel unit further comprises a plurality of scan lines 3 and data lines 4. The scan lines 3 and the data lines 4 are positioned across each other. The scan lines 3 and the first main electrode 21 are positioned in parallel. The data lines 4 and the second main electrode 22 are positioned in parallel. The scan lines 3 and the data lines 4 surround the sub-pixel unit. The DBS common line 5 is position on the top of the data line 4. The pixel unit further comprises a switch unit 6. The switch unit 6 is electrically connected to the pixel electrode 1, the scan line 3 and the data line 4.

The width of each of the electrode portions 10 and/or the width of each of the strip portions 11 and/or the width of each of the slits 12 is different. This allows the pixel electrode 1 to have different aperture ratio-voltage curves in different positions. This could improve the viewing angle problem.

Specifically, through changing the width of the electrode portion 10 (changing the pixel distance of the pixel electrode 1), the aperture ratio-voltage curves in different positions become different. Please refer to FIGS. 2-5, which respectively show a scale-up diagram of the region A in FIG. 1. FIGS. 2-5 respectively represent four different embodiments of the pixel electrode 1. Please note, in the following embodiments utilize adjacent the first electrode portion 101 and the second electrode portion 102 as an example. The first electrode portion 101 comprises the first strip portion 111 and the first slit 121. The second electrode portion 102 comprises the second strip portion 112 and the second slit 122.

Figure 2:
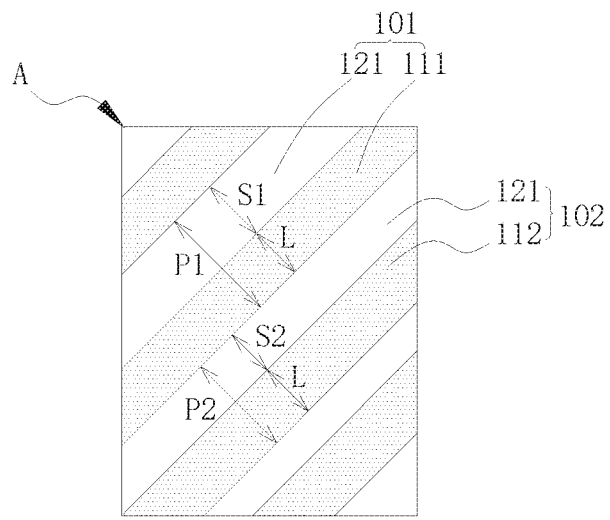
FIG. 2 is a scale-up diagram of a part of a pixel electrode according to a first embodiment of the present invention.

Please refer to FIG. 2. FIG. 2 is a scale-up diagram of a part of a pixel electrode according to a first embodiment of the present invention. In this embodiment, the width of each of the electrode portions 10 is different. The width of each of the strip portions 11 is the same but the width of each of the slits 12 is different. In other words, the widths of the strip portions 11 remain the same. Through changing the widths of the slits 12 in different positions, the electrode portions 10 have different widths in different positions such that the pixel electrode 1 could have different pixel distances in different positions. In this way, the aperture ratio-voltage curves in different positions are different such that the viewing angle could be improved.

The widths of the first strip portion 111 and the second strip portion 112 are the same (L). The width of the first slit 121 is S1. The width of the second slit 122 is S2. Here, S1 is not equal to S2. The width of the first electrode portion 101 is P1. The width of the second electrode portion 102 is P2. Therefore, P1 is not equal to P2.

Figure 3:
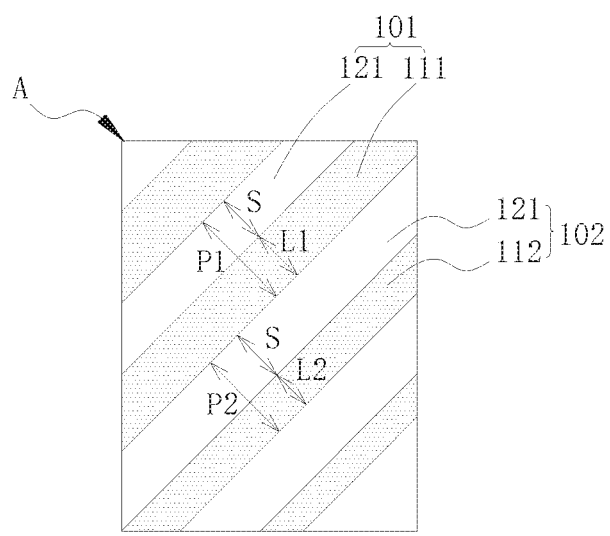
FIG. 3 is a scale-up diagram of a part of a pixel electrode according to a second embodiment of the present invention.

Please refer to FIG. 3. FIG. 3 is a scale-up diagram of a part of a pixel electrode 1 according to a second embodiment of the present invention. In this embodiment, the width of each of the electrode portions 10 is different. The width of each of the strip portions 11 is different but the width of each of the slits 12 is the same. In other words, the widths of the slits 12 remain the same. Through changing the widths of the strip portions 11 in different positions, the electrode portions 10 have different widths in different positions such that the pixel electrode 1 could have different pixel distances in different positions. In this way, the aperture ratio-voltage curves in different positions are different such that the viewing angle could be improved.

The width of the first slit 121 and the second slit 122 are the same (S). The width of the first strip portion 111 is L1 and the width of the second strip portion 112 is L2. Here, L1 is not equal to L2. The width of the first electrode portion 101 is P1. The width of the second electrode portion 102 is P2. Therefore, P1 is not equal to P2.

From FIG. 2 and FIG. 3, the widths of the electrode portions 10 evenly changes along the direction far to near the first main electrode 21. In another embodiment, the width variation of the electrode portions 10 could be not limited to a fixed value.

Figure 4:
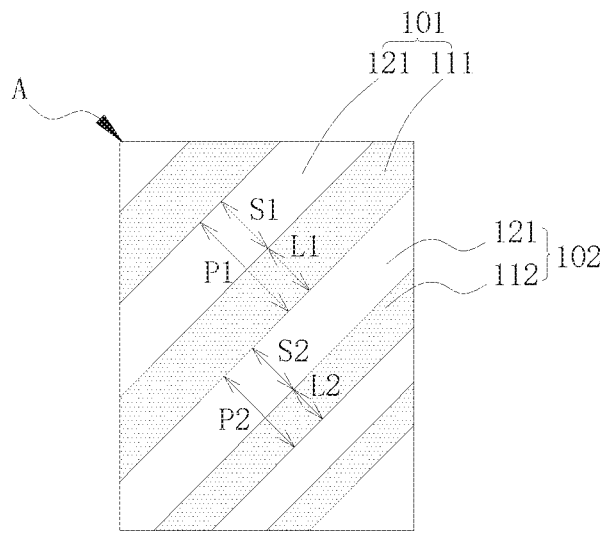
FIG. 4 is a scale-up diagram of a part of a pixel electrode according to a third embodiment of the present invention.

Please refer to FIG. 4. FIG. 4 is a scale-up diagram of a part of a pixel electrode according to a third embodiment of the present invention. In this embodiment, the width of each of the electrode portions 10 is different. The width of each of the strip portions 11 is different and the width of each of the slits 12 is also different. Through changing the widths of the strip portions 11 and the slits 12 in different positions, the electrode portions 10 have different widths in different positions such that the pixel electrode 1 could have different pixel distances in different positions. In this way, the aperture ratio-voltage curves of the pixel electrode 1 in different positions are different such that the viewing angle could be improved.

The width of the first strip portion 111 is L1 and the width of the second strip portion 112 is L2. Here, L1 is not equal to L2. The width of the first slit 121 is S1 and the width of the second slit 122 is S2. S1 is not equal to S2. The width of the first electrode portion 101 is P1. The width of the second electrode portion 102 is P2. P1 is not equal to P2.

Figure 5:
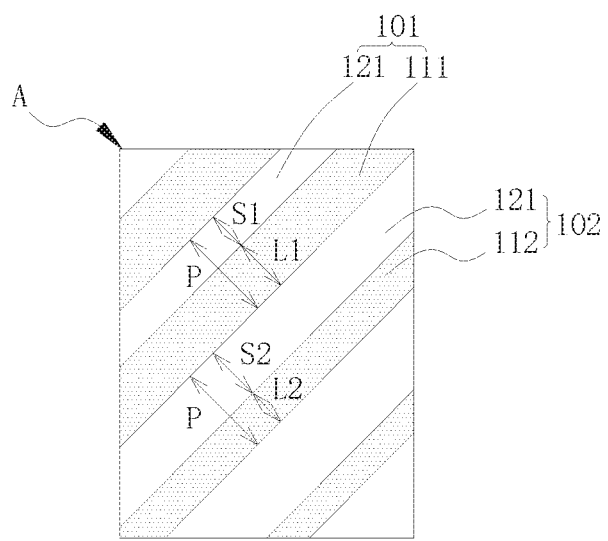
FIG. 5 is a scale-up diagram of a part of a pixel electrode according to a fourth embodiment of the present invention.

Please refer to FIG. 5. FIG. 5 is a scale-up diagram of a part of a pixel electrode according to a fourth embodiment of the present invention. In this embodiment, the width of each of the electrode portions 10 is the same. The width of each of the strip portions 11 is different and the width of each of the slits 12 is also different. In other words, the widths of the electrode portions 10 could remain the same. Through changing the widths of the strip portions 11 and the slits 12 in different positions, the aperture ratio-voltage curves of the pixel electrode 1 in different positions are different such that the viewing angle could be improved.

The width of the first strip portion 111 is L1 and the width of the second strip portion 112 is L2. Here, L1 is not equal to L2. The width of the first slit 121 is S1 and the width of the second slit 122 is S2. S1 is not equal to S2. The width of the first electrode portion 101 and the width of the second electrode portion 102 are the same (P).

The width of each of the electrode portions 10 is between 5 microns and 6 microns.

The width of each of the strip portions 11 is between 2 microns and 4 microns.

The width of each of the slits 12 is between 2 microns and 3 microns.

The angle between the slit 12 and the first main electrode 21 is one of 35 degree, 40 degree and 45 degree. This is not a limitation of the present invention.

In order to clearly illustrate the above-mentioned embodiments of the present invention, only one of the four domains is used for illustration. Please note, the four different sub-pixel units in the pixel unit all obey the spirit of the present invention. Furthermore, the strip portions 11 and the slits 12 are symmetrically positioned in each of the sub-pixel units to increase the symmetry of the pixel electrode 1.

In addition, an LCD device is disclosed. The LCD device comprises the above-mentioned pixel unit. The LCD device could be an LCD display or a mobile device, a wearable device, or a VR device having an LCD display. This is not a limitation of the present invention.

A pixel unit and an LCD device are disclosed. The pixel unit comprises four sub-pixel units. Each of the sub-pixel unit comprises a pixel electrode. The pixel electrode comprises an electrode portion. The width of the electrode portion is a sum of the width of the strip portion and the width of the slit. The width of each of the electrode portions and/or the width of each of the strip portions and/or the width of each of the slits in different positions is different such that the pixel electrodes in different positions have a different aperture ratio-voltage curve. This improves the viewing angle deviation of the four domain pixel electrode and raises the display quality of the LCD device.

Above are embodiments of the present invention, which does not limit the scope of the present invention. Any modifications, equivalent replacements or improvements within the spirit and principles of the embodiment described above should be covered by the protected scope of the invention.

What is claimed is:

1. A pixel unit, comprising four sub-pixel units, each of the sub-pixel units comprising a pixel electrode, comprising a plurality of strip portions positioned at intervals, wherein two adjacent strip portions define a slit, one strip portion and one slit adjacent to the strip portion are defined as an electrode portion and a width of the electrode portion is a sum of a width of the slit and a width of the strip portion; wherein the width of each of the electrode portions is different, the width of each of the strip portions is different, and the width of each of the slits is different; and wherein the strip portions and the slits are respectively positioned symmetrically in each of the sub-pixel units.

2. The pixel unit of claim 1, wherein the width of each of the electrode portions is between 5 microns and 6 microns.

3. The pixel unit of claim 1, wherein the width of each of the strip portions is between 2 microns and 4 microns.

4. The pixel unit of claim 1, wherein the width of each of the slits is between 2 microns and 3 microns.

5. The pixel unit of claim 1, further comprising a main electrode, comprising a first main electrode and a second main electrode, wherein the first main electrode is horizontally positioned and the second main electrode is vertically positioned, and the strip portion extends along the second main electrode to an edge of the pixel electrode; wherein an angle between the slit and the first main electrode is one of 35 degree, 40 degree and 45 degree.

6. The pixel unit of claim 5, wherein widths of the electrode portions evenly change along a direction from far to near the first main electrode.

7. A pixel unit, comprising four sub-pixel units, each of the sub-pixel units comprising a pixel electrode, comprising a plurality of strip portions positioned at intervals, wherein two adjacent strip portions define a slit, one strip portion and one slit adjacent to the strip portion are defined as an electrode portion and a width of the electrode portion is a sum of a width of the slit and a width of the strip portion; wherein the width of each of the electrode portions is different, the width of each of the strip portions is different, and the width of each of the slits is different.

8. The pixel unit of claim 7, wherein the width of each of the electrode portions is between 5 microns and 6 microns.

9. The pixel unit of claim 7, wherein the width of each of the strip portions is between 2 microns and 4 microns.

10. The pixel unit of claim 7, wherein the width of each of the slits is between 2 microns and 3 microns.

11. The pixel unit of claim 7, further comprising a main electrode, comprising a first main electrode and a second main electrode, wherein the first main electrode is horizontally positioned and the second main electrode is vertically positioned, and the strip portion extends along the second main electrode to an edge of the pixel electrode; wherein an angle between the slit and the first main electrode is one of 35 degree, 40 degree and 45 degree.

12. A liquid crystal display (LCD) device, comprising a pixel unit of claim 7.

* * * * *